United States Patent [19]
Gellert

[11] Patent Number: 5,096,411
[45] Date of Patent: Mar. 17, 1992

[54] INJECTION MOLDING CAST MANIFOLD

[76] Inventor: Jobst U. Gellert, 7A Prince Street, Georgetown, Ontario, Canada, L7G 2X1

[21] Appl. No.: 702,120

[22] Filed: May 16, 1991

Related U.S. Application Data

[63] Continuation of Ser. No. 535,706, Jun. 11, 1990, abandoned.

[30] Foreign Application Priority Data

May 17, 1990 [CA] Canada .................. 2017005

[51] Int. Cl.⁵ .............................. B29C 45/73
[52] U.S. Cl. .................. 425/547; 264/328.8; 264/328.12; 425/567; 425/572; 425/588
[58] Field of Search ............ 264/297.1, 328.8, 328.12, 264/328.15; 425/547, 548, 549, 567, 572, 588; 164/61, 80, 112; 29/611

[56] References Cited

U.S. PATENT DOCUMENTS

| | | | |
|---|---|---|---|
| 3,849,048 | 11/1974 | Bielfeldt et al. | 425/567 |
| 4,609,138 | 9/1986 | Harrison | 425/572 |
| 4,648,546 | 3/1987 | Gellert | 29/611 |
| 4,688,622 | 8/1987 | Gellert | 164/61 |
| 4,761,342 | 8/1988 | Bjorhaag et al. | 106/18.12 |
| 4,761,343 | 8/1988 | Gellert | 425/549 |
| 4,854,851 | 8/1989 | Gellert | 425/549 |
| 4,865,535 | 12/1989 | Gellert | 425/549 |
| 4,865,535 | 9/1989 | Gellert | 425/549 |

OTHER PUBLICATIONS

Mold Master's Catalog—Your Connection to Injection Molding Excellence: Modular Manifolds, Apr.-1986.

*Primary Examiner*—Tim Heitbrink
*Attorney, Agent, or Firm*—Dalesman & Company

[57] ABSTRACT

A cast manifold for distributing pressurized melt in an injection molding system. The melt is received at a central inlet on the rear surface of the manifold to an inlet portion of a melt passage. Four identical outlet portions of the melt passage branch radially outward from the inlet portion to equally radially spaced outlets on the forward surface of the manifold. Each outlet portion extends around a first smoothly curved bend from the inlet portion, along a radial portion, and then around a second smoothly curved bend to the outlet. By casting on a removable ceramic mold, the bends in the melt passage are very smoothly curved and do not all have to extend in a common plane. Furthermore, the radial portions angle a substantial distance rearwardly as they extend outwardly which allows the thickness of the manifold to be reduced.

4 Claims, 3 Drawing Sheets

INJECTION MOLDING CAST MANIFOLD

This application is a continuation of Ser. No. 07/535,706, filed June 11, 1990, now abandoned.

BACKGROUND OF THE INVENTION

This invention relates to injection molding and more particularly to a heated melt conveying manifold for a multi-cavity injection molding system.

Heated manifolds for distributing melt from a common inlet to a number of spaced outlets are well known in the art. It is also well known that the length and size of the melt passage through the manifold must be equal or balanced and that sharp bends or corners are not acceptable as they can result in decomposition of the melt due to undue stress. An example of a bridging manifold system is shown in the applicant's U.S. Pat. No. 4,761,342 which issued Aug. 2, 1988. The various elongated manifolds were made by the composite plate method described in the applicant's U.S. Pat. No. 4,648,546 which issued Mar. 10, 1987. As can be seen, while they are suitable for many applications, these manifolds have the disadvantage that the portions of the melt passage having the smoothly curved bends necessarily extend in a single plane.

Another example of manifold manufacture which is suitable in some cases is the drill and plug method disclosed in U.S. Pat. No. 4,609,138 to Harrison which issued Sept. 2, 1986. This method has the inherent problem that it is difficult to make the bends in the melt passage sufficiently smooth for high stress applications and materials.

SUMMARY OF THE INVENTION

Accordingly it is an object of the present invention to at least partially overcome the problems of the prior art by providing a manifold having a melt passage with only smoothly curved bends and outlet passages extending outwardly in more than two radial directions. To this end, in one of its aspects, the invention provides an injection molding cast steel manifold comprising a rear surface, a forward surface which extends parallel to the rear surface, and a melt passage which extends therethrough from the rear surface to the forward surface, the melt passage having a common inlet portion which extends forwardly from a central inlet on the rear surface, the melt passage having more than two identical equally radially spaced outlet portions which branch outwardly from the common inlet portion, each outlet portion having a first smoothly curved bend extending from the inlet portion and a second smoothly curved bend extending to an outlet on the forward surface, each outlet portion having a radial portion which extends a substantial distance rearwardly as it extends outwardly from the first bend to the second bend.

Further objects and advantages of the invention will appear from the following description, taken together with the accompanying drawings.

DETAILED DESCRIPTION OF THE INVENTION

Figure 1:
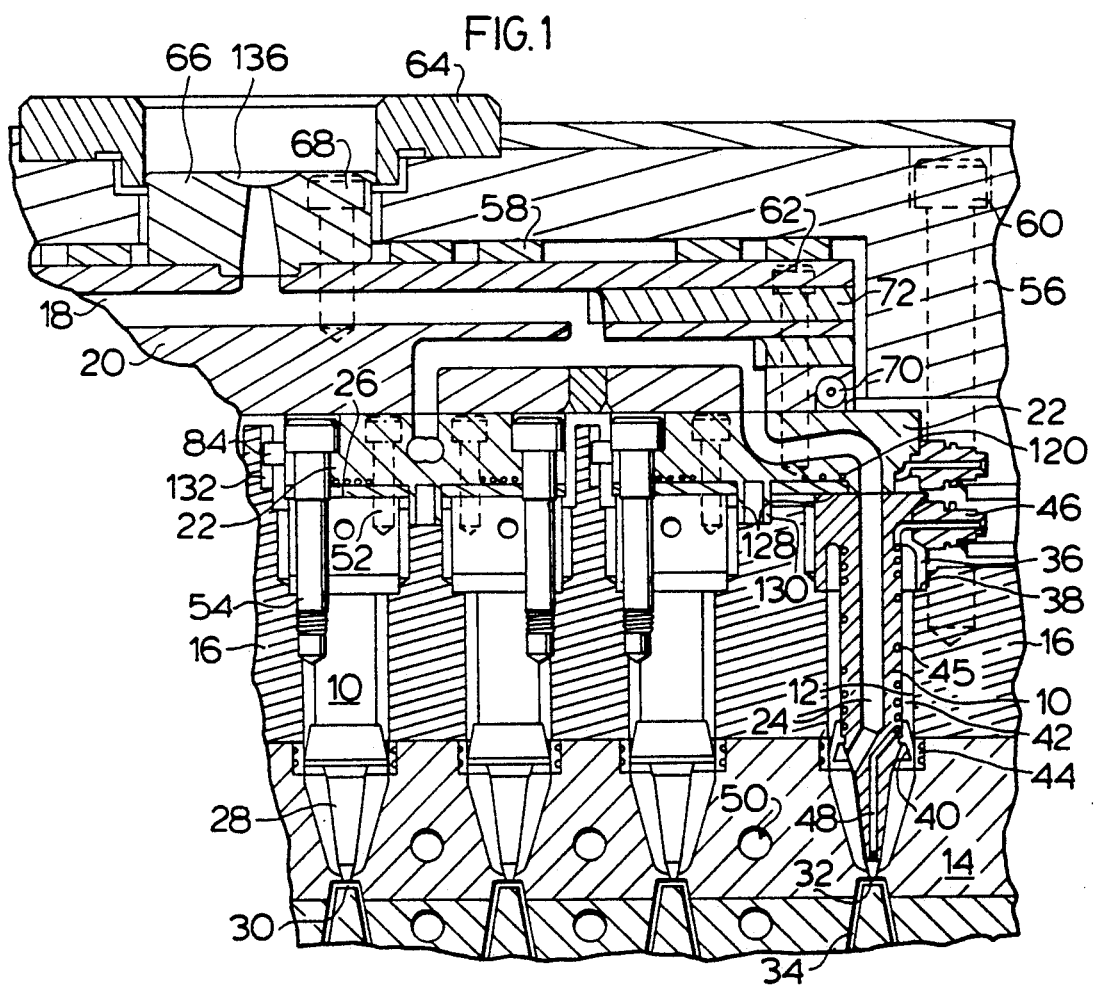
FIG. 1 is a partial sectional view of a portion of an injection molding system having a number of manifolds according to a preferred embodiment of the invention.

Reference is first made to FIG. 1 which shows part of a multi-cavity injection molding system having a number of heated nozzles 10, each seated in a well 12 in a cavity plate 14 and a support plate 16. In this particular example, the melt passage 18 branches in a conventional elongated manifold 20 to a number of sub-manifolds 22 according to the invention which are mounted between the manifold 20 and the nozzles 10. Of course, in other arrangements, a manifold according to the invention could be mounted to receive melt directly from the molding machine rather than to act as a sub-manifold. In FIG. 1, the section of the right hand sub-manifold 22 is taken along line 1—1 in FIG. 4 to show the melt passage 18 as it continues from the sub-manifold 22 through the central bore 24 of the nozzle 10.

Each nozzle 10 has a rear face 26 which abuts against the sub-manifold 22 and a tapered nose portion 28 leading to a pointed tip 30 at the forward end. The pointed tip 30 is in alignment with a gate 32 extending through the cavity plate 14 to a cavity 34. The nozzle 10 is located in this position in the well 12 by a circumferential insulation bushing 36 sitting on a circumferential flange 38. The nozzle 10 also has a sealing and locating flange 40 which extends across an insulative air space 42 to abut against a cylindrical insulating ring 44, as described in the applicant's U.S. Pat. No. 4,854,851 which issued Aug. 8, 1989. Each nozzle 10 is heated by an electrical heating element 45 which extends from an external cold terminal 46 and has a portion 48 which extends into the nose portion 28 of the nozzle 10 as described in the applicant's U.S. Pat. No. 4,865,535 which issued Sept. 12, 1989. The cavity plate 14 is cooled by pumping cooling water through cooling conduits 50. Each nozzle 10 is secured to a sub-manifold 22 by bolts 52. The sub-manifolds 22 are, in turn, secured to the support plate 16 by bolts 54. The elongated manifold 20 is positioned against the sub-manifolds 22 by a clamp plate 56 and titanium pressure pads 58. The clamp plate 56 is held in position by bolts 60 extending into the support plate 16. In addition, each sub-manifold 22 is attached to the elongated manifold 20 by bolts 62. A locating collar 64 extends around a manifold extension 66 which is fastened by bolts 68 to the manifold 20. The manifold 20 is heated by an electrical heating element 70 which is cast into it as described in the applicant's U.S. Pat. No. 4,688,622 which issued Aug. 25, 1987. The elongated manifold 20 is made with plugs 72 as described in detail in the applicant's U.S. Pat. No. 4,609,138 referred to above.

Figure 2:
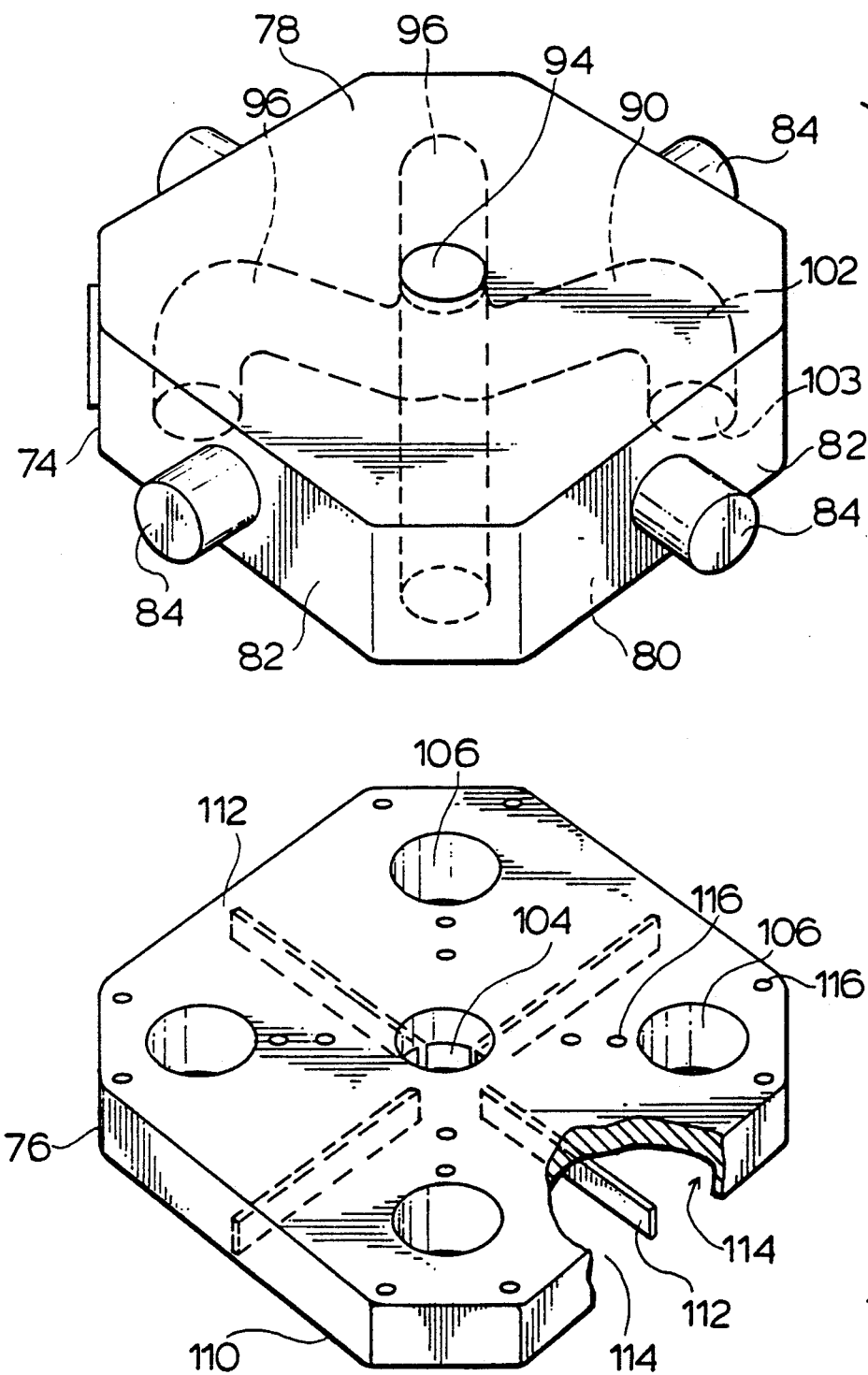
FIG. 2 is an exploded isometric view showing how the components of a manifold are assembled.

The sub-manifold 22 and method of making it according to one embodiment of the invention will now be described with particular reference to FIGS. 2, 3 and 4. A rear body portion 74 and a forward plate portion 76 are cast out of a suitable steel The rear body portion 74 has a rear surface 78, a forward surface 80 and four outer surfaces 82. As seen in FIG. 2, each of the outer surfaces 82 has a locating pin 84 extending outwardly therefrom. The forward surface 80 of the rear body portion 74 has a hollow locating portion 86 extending centrally therefrom. In this embodiment, the forward surface 80 also has four forwardly projecting collar portions 88.

Figure 3:
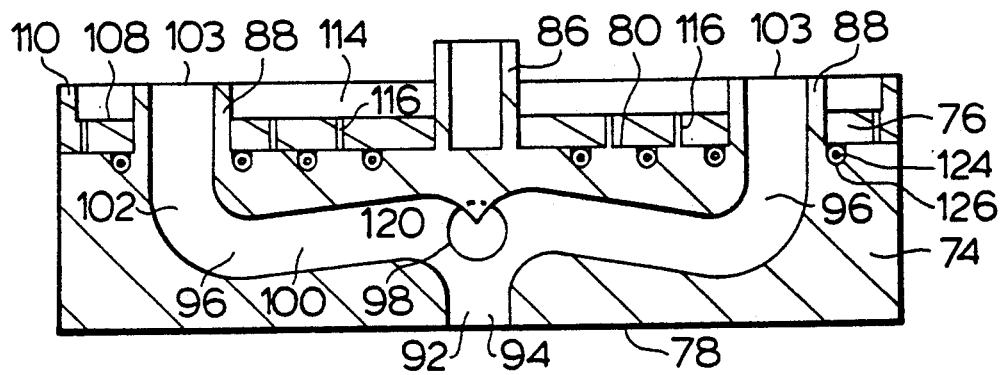
FIG. 3 is a section view illustrating further steps in the method of manufacture of the manifold according to the invention.

The rear body portion 74 is made by investment casting the steel on a removable ceramic mold which is shaped to provide a melt passage 90 having the critical shape shown in FIGS. 2 and 3. As can be seen, the melt passage 90 has a common inlet portion 92 which extends from a central inlet 94 on the rear surface 78. In this embodiment, four outlet portions 96 branch outwardly from the common inlet portion 92. Each outlet portion 96 extends around a first smoothly curved bend 98, along a radial portion 100, and then around a second smoothly curved bend 102 to an outlet 103 through one of the collar portions 88. The shape of the melt passage 90 is critical to the successful operation of the injection molding system for some applications. Firstly, the outlet portions 96 branch radially outward from the inlet portion 92 in more directions than two. In other words, the curved portions of the melt passage are not restricted to being in a single common plane. While there are four equally spaced outlet portions 96 in this embodiment, there can be three or more than four outlet portions for other mold configurations. It is important that the outlet portions be identical in length and size to avoid uneven pressure drop of the melt flowing through them. Secondly, the bends 98,102 can be made very smoothly curved. This is extremely important for molding certain materials which are susceptible to stress at higher flow velocities. Thirdly, as can be clearly seen in FIG. 3, the radial portion 100 of each outlet portion 96 is made to angle a substantial distance rearwardly as it extends outwardly from the first bend 98 to the second bend 102. This allows the overall thickness of the sub-manifold 22 to be reduced which can be very important for some applications.

The forward plate portion 76 is cast of steel to match the size of the rear body portion 74. The forward plate portion 76 has a central hole 104 therethrough to receive the central locating pin 86 of the rear body portion 74. The forward plate portion 76 also has four spaced holes 106 therethrough to receive the collar portions 88 which project forwardly from the rear body portion 74. The forward face 108 of the forward plate portion 76 also has a forwardly projecting outer rim 110 and four forwardly projecting partition portions 112 to form four equal sized recessed compartments 114. A number of spaced small ducts 116 extend from each of these compartments 114 through the forward plate portion 76.

Figure 4:
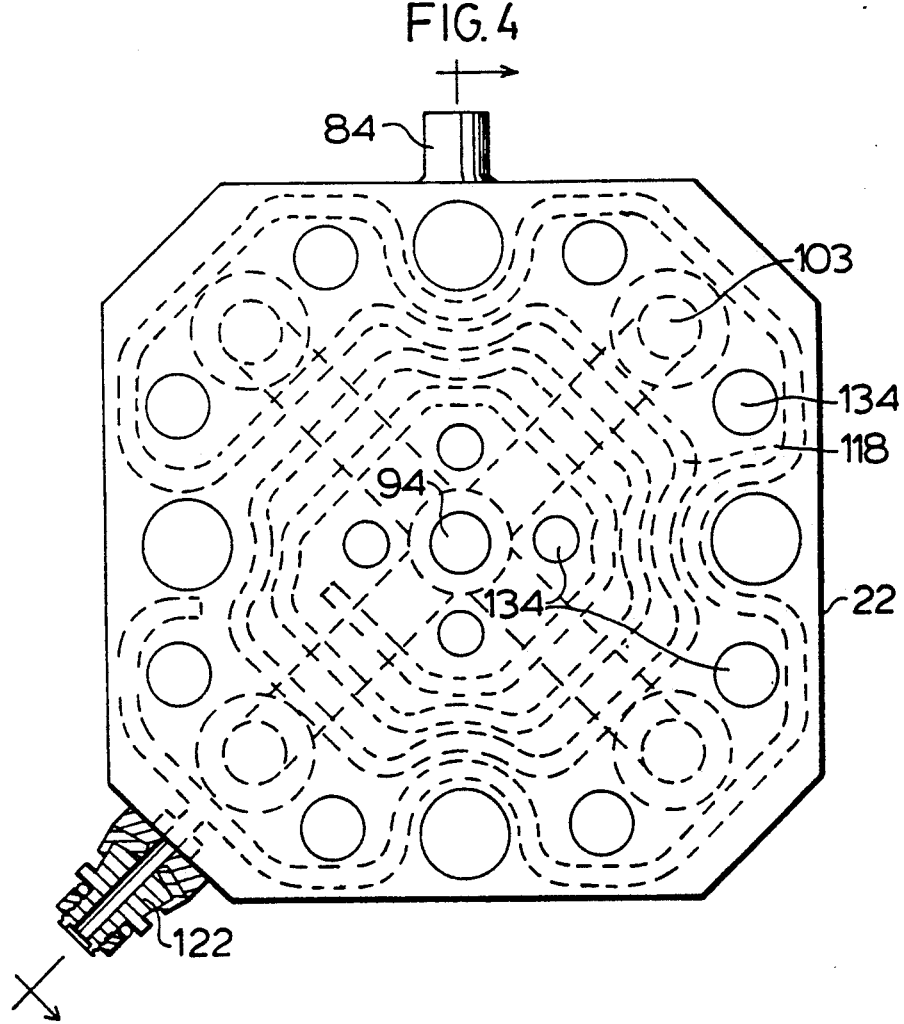
FIG. 4 is a plan view of a finished manifold.

The forward surface 80 of the rear body portion 74 is made with a groove 118 which extends in a predetermined pattern, as seen in FIG. 4. An electrical heating element 120 is wound in this groove 118 and extends to an external cold terminal 122. The heating element 120 has a conventional structure with a nickel-chromium resistance wire 124 extending centrally through a refractory powder electrical insulating material such as magnesium oxide inside a steel casing 126.

The forward plate portion 76 is then mounted on the rear body portion 74 in the inverted position shown in FIG. 3. An equal amount of a nickel alloy brazing powder is then poured into each compartment 114 and the assembly is heated in a vacuum furnace. As the furnace is gradually heated to a temperature above the melting point of the nickel alloy, the furnace is evacuated to a relatively high vacuum to remove substantially all of the oxygen. Before the melting temperature of the nickel alloy is reached, the vacuum is reduced by partially backfilling with an inert gas such as nitrogen or argon. When the nickel alloy melts, it flows through the ducts 116 and by capilliary action around the heating element 120 in the groove 118 and around the central locating pin 86 and the collar portions 88. Thus, the rear body portion 74 and the forward plate portion are integrally brazed together, with the heating element 120 integrally brazed in the groove 118. Brazing them in a vacuum provides a metallurgical bonding of the nickel alloy which improves the efficiency of the heat transfer from the heating element 120 to the surrounding steel.

After the sub-manifolds 22 are removed from the vacuum furnace and cooled, they are machined to remove the outer rim 110 and partition portions 112 to provide a smooth forward surface 128 with the central locating portion 86 extending therefrom. As seen in FIG. 1, this locating portion 86 is received in a seat 130 in the support plate 16 to accurately locate the sub-manifold 22 relative thereto. Depending upon the mold configuration and the desired orientation of the sub-manifold 22, a selected three of the four outwardly projecting locating pins 84 are also machined off prior to assembly. As also seen in FIG. 1, the remaining pin 84 is received in a slot 132 in the support plate 16 to rotationally locate the sub-manifold 22 relative thereto. The sub-manifolds are drilled to provide bolt holes 134 therethrough, as seen in FIG. 4.

In use, after the injection molding system has been assembled as shown in FIG. 1, electrical power is applied to the heating elements 45,70 and 120 to heat the nozzles 10, manifold 20 and sub-manifold 22 to a predetermined operating temperature. Pressurized melt from a molding machine (not shown) is then injected into the melt passage 18 through the inlet 136 in the manifold extension 66 according to a predetermined cycle in a conventional manner. The pressurized melt flows through the melt passage in the elongated manifold 20 and into the melt passage 90 in each sub-manifold 22.

Each outlet 103 from a sub-manifold 22 is aligned with the central melt bore 24 of a nozzle 10 through which the pressurized melt flows into a space 136 surrounding the nose portion 28, and then through the gate 32 to fill the cavity 34. The space 136 remains filled with melt, a portion of which solidifies adjacent the cooled cavity plate 14, and the sealing and locating flange 40 prevents it escaping into the insulative air space 42. After the cavities 34 are filled, injection pressure is held momentarily to pack and then released. After a short cooling period, the mold is opened to eject the molded products. After, ejection, the mold is closed and injection pressure is reapplied to refill the cavities. This cycle is continuously repeated with a frequency dependent on the size and shape of the cavities and the type of material being molded.

While the description of the sub-manifolds 22 and method of making them has been given with respect to preferred embodiments, it is not to be construed in a limiting sense. Variations and modifications will occur to those skilled in the art. For instance, it is apparent that the sub-manifold 22 shown and described can be used as a manifold to receive melt directly from the molding machine. Therefore, the term "manifold" is used in the claims to include both possibilities. Reference is made to the appended claims for a definition of the invention.

What I claim is:

1. An injection molding cast steel manifold comprising a rear surface, a forward surface which extends parallel to the rear surface, and a melt passage which extends therethrough from the rear surface to the forward surface, the melt passage having a common inlet portion which extends forwardly from a central inlet on the rear surface, the melt passage having more than two spaced apart outlet portions which branch outwardly from the common inlet portion, each outlet portion having a first smoothly curved bend extending from the inlet portion and a second smoothly curved bend extending to an outlet on the forward surface, each outlet portion having a radial portion which extends a substantial distance rearwardly as said radial portion extends outwardly from the first bend to the second bend, and each outlet portion and outlet being located at different angular positions along the forward surface with respect to an axis passing through the central inlet.

2. An injection molding cast steel manifold as claimed in claim 1 wherein the manifold has an integral rear body portion, a forward plate portion and an electrical heating element extending with a predetermined configuration in a groove in the rear body portion adjacent the forward plate portion.

3. An injection molding cast steel manifold as claimed in claim 2 wherein the rear body portion has a central locating portion which extends through a matching hole in the forward plate portion a predetermined distance forwardly from the forward surface of the manifold.

4. An injection molding cast steel manifold as claimed in claim 1 wherein the manifold is cast with at least four outer surfaces with a locating pin extending outwardly from each outer surface, whereby a selected three of the locating pins can be machined off prior to installation of the manifold depending upon how the manifold is oriented.

* * * * *